United States Patent Office 2,993,926
Patented July 25, 1961

2,993,926
METHOD OF PREPARING NITRILES
Russell J. Stenberg, St. Paul, and Alfred E. Rheineck, Minneapolis, Minn., assignors to Archer-Daniels-Midland Company, Hennepin County, Minn., a corporation of Delaware
No Drawing. Filed Oct. 30, 1957, Ser. No. 693,273
11 Claims. (Cl. 260—465.2)

This invention relates to an improvement in a catalytic method for preparing aliphatic nitrile compounds in a liquid phase at atmospheric pressure. More particularly the invention relates to an improvement in the catalytic preparation of long chain nitrile compounds preferably from fatty esters and also fatty acids or polymers thereof, by utilizing a tetravalent metal alcoholate catalyst.

The use of catalysts in vapor phase reactions for the preparation of long chain fatty nitriles is known. The use of soaps or salts of organic acids for liquid phase reactions are also known in the production of nitrile compounds from fatty acids and esters. However, such salts are also known to cause polymerization of unsaturated esters and acids during the nitrile formation and do not always produce the best yields. Due to the requirement for careful selectivity in producing nitriles, there is need for knowledge of additional catalysts which will not cause excessive polymerization of long chain unsaturated fatty esters and fatty acids. There is need also for a catalyst which will produce nitriles from polymerized fatty acids and their esters. Such catalysts should produce high yields of nitriles of saturated and unsaturated compounds in repeated use and not interfere with the reduction of nitriles to amines.

Accordingly, it is an object of this improvement to provide a commercially feasible and economic liquid phase process for converting simple saturated and unsaturated fatty acids, esters of these simple acids, and polymers of fatty acids and their esters, to nitriles utilizing a tetravalent metal alcoholate catalyst, without causing excessive polymerization of unsaturated fatty acids and esters, or depolymerization of polymerized fatty acids and esters.

It is an object of this improvement to provide a liquid phase atmospheric pressure process for the conversion of fatty acids and their esters, in liquid phase, to nitriles in less processing time than a similar uncatalyzed reaction.

Another object of this improvement is to provide an economically and commercially feasible liquid phase process of converting long chain fatty acids and their esters, and polymers of fatty acids and their esters to nitriles by repeatedly utilizing a tetravalent metal alcoholate catalyst.

The preferred catalysts, of the present disclosure, are in the form of a tetravalent metal alcoholate $M(OR^3)_4$ where M is the metal, preferably titanium and $R^3$ is an alkyl group inclusive of methyl through octyl including the iso and branched forms thereof, or a catalytic residue of the metal salt of a previous process, which corresponds to $M(R^4COO)_4$ where $R^4$ is an alkyl group of 1 to 23 carbon atoms and M is the metal, preferably titanium, as illustratively embodied herein. Generally, the catalysts may be considered as aliphatic organic derivatives of tetravalent metals. Similarly, the other metals of group IVB of the periodic table, zirconium and hafnium alcoholates and their residues, are also suitable catalysts. The catalyst, as the metal, may vary from 0.01% to 1.5% based on the weight of the fatty acid or its ester derivative, and preferably is on the order of about 0.1% to 1.0%. The titanium catalyst has the ability of forming nitriles from fatty acids in about two-thirds of the time required for a similar uncatalyzed reaction, i.e. 12 vs. 18 hours.

As indicated, the fatty materials containing fatty radicals to be converted to nitrile compounds are fatty acids, fatty esters, or mixtures and polymers thereof. The simple aliphatic fatty acids and esters have from 8 to about 36 and preferably about 12–22 carbon atoms in the fatty radical forming a basic chain unit. In the polymeric acids and esters, the fatty radical basic units may occur as repeating chains, or multiples of preferably 18 carbon atoms which structures are found in polymerized fatty oils. Polymeric acids and their esters may contain between two and five fatty chain units per molecule. Generally, polymeric products are mixtures which also contain some monomeric compound. The fatty materials may be illustrated as follows:

For non-polymeric products 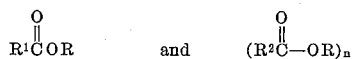 For polymeric products where R is hydrogen or an alkyl radical up to 8 carbon atoms inclusive, $R^1$ is a non-polymeric alkyl radical of 7 to 35 carbon atoms $R^2$ is a unit of a polymer, the unit containing preferably 12 to 22 carbon atoms and providing by repeating units a polymeric structure characteristic of that found in polymerized oils and $n$ is an average of the number units polymerized, varying from 2 to 4.

The fatty materials to be converted to nitriles and amines according to the improvement in this invention are derived from several sources; thus (a) Straight chain unsubstituted fatty acids and their short chain monohydric alcohol esters are derived from fats, non-drying, semi-drying and drying oils such as lard, tallow, hydrogenated tallow, coconut, palm, peanut, olive, corn, soya, safflower, linseed, dehydrated castor and marine oils. The acids can be the single components, or mixtures as they exist in the base fats and oils.

(b) Branched chain and cyclic acids such as derived by synthesis or from petroleum materials are also adaptable to the method of this invention. This group includes acids up to 36 carbon atoms in the base unit comprising naphthenic acids, including "Sunaptic Acids" and branched chain acids resulting from the oxo-process.

(c) Rosin acids such as gum and wood rosin, and rosin fatty acid mixtures as in tall oil are used advantageously in this process.

(d) Polymeric acids, and their monohydric alcohol esters, which have the structure found in bodied oils, or polymerized per se are adaptable to this process. These comprise acids and esters prepared by saponification and alcoholysis of bodied oils such as linseed, dehydrated castor, soya and cotton seed respectively. The degree of polymerization of these oils, as measured by their viscosity, can vary from about J/K to $Z_3/Z_5$, Gardner-Holdt standards. Bodied acids available as "dimer or trimer acids" can be used also.

Such acids and monohydric alcohol esters when treated with gaseous ammonia in the presence of the metal tetraalkoxides, as described, produce the resulting nitriles, empirically represented for acids and esters as follows:

(A) 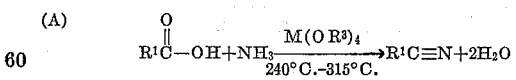

(B) 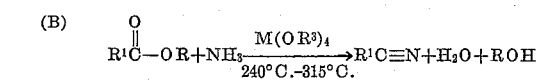

M, R, $R^1$ and $R^3$ being as defined above.

In general the temperature of reaction is from about 250° C. to the boiling point of the particular fatty acid or its ester and under the conditions of reaction usually not over 315° C. The preferred temperature range is 280–295° C. The reaction time is variable and dependent upon the temperature, amount of catalyst and rate of ammonia flow. The reaction continues until no more water is formed. The conditions are so chosen that the reaction is completed in about 12 hours. Variations in the procedure are dependent on variations in temperature, ratios of reactants and time, each more or less dependent upon the particular fatty material used.

The catalyst and nitrile are separated by distillation or acid washing. The method used is determined by the nature of the products. In the case of non-polymeric compounds the separation is effected by distillation, in which case the residue contains the catalyst which can be re-used. With polymeric compounds, which are difficult to distill, the catalyst is removed by an acid wash, e.g. dilute hydrochloric acid, after which the product is washed with water and dried by heating or desiccating. Both methods are used.

The fatty nitriles are used as plasticizers, rubber softeners, grease and oil additives, in lubricants, as chemical intermediates, e.g., in producing insecticides and amines.

All nitrile preparations are carried out in a reactor provided with a thermometer, a gas inlet tube, agitator and a vertical steam jacketed condenser connected at the top to a water jacketed downward condenser leading to the distillate receiver. The gas inlet tube is set below the surface of the reaction mixture.

More particularly typical illustrations are given by the following examples showing the preparation of nitriles and their utilization to amines:

EXAMPLE I

The preparation of a nitrile from a fatty acid was accomplished in the above apparatus by mixing 560 parts (2 moles) stearic acid and 12 parts (0.36% Ti) tetra-isopropyl titanate and heating the mixture. Anhydrous ammonia was bubbled into the mixture upon its reaching 100° C. and continued throughout the reaction period. The temperature of 270° C. to 288° C. is gained in 1 hour and held for a period of about 7 hours, at which time the reaction is considered complete since no more water of reaction was liberated.

A similar reaction run without catalyst required a considerably longer total time measured in hours.

The nitrile product of reaction was separated from the catalyst by distillation at 0.5 mm. Hg pressure in a temperature range of 140° C. to 170° C. and when analyzed contained 5.35% nitrogen (theory 5.36) and an acid value of 0.20. The residue was considered as recovered catalyst.

The process and condition of Example I was used to prepare other nitriles and amines as shown in Examples II to V inclusive in the following table.

| Examples | Fatty Compounds | Percent Ti Catalyst | Percent Yield | Percent N |
|---|---|---|---|---|
| II | Soya Acids | 0.36 | 86.0 | 5.35 |
| III | Linseed Acids | 0.36 | 49.0 | 5.20 |
| IV | Oleic Acid | 0.36 | 87.3 | 5.30 |
| V | Tallow Acids | 0.35 | 83.+ | 5.48 |

Examples IV and V used tetra propyl and tetra butyl titanates, respectively, in the same process.

EXAMPLES VI TO IX

These examples show the effect of different titanium tetra alkoxides on the conversion of monohydric alcohol esters to nitriles.

| Example | Ester | Reaction Time, Hrs. | Catalyst Percent Ti | Catalyst Alkoxy Group | Percent Yield | A.V. | Percent N₂ | Iod. Val. |
|---|---|---|---|---|---|---|---|---|
| VI | Methyl Soyate | 8.5 | 0.36 | isopropyl | 83 | 0.21 | 5.3 | 110 |
| VII | Hexyl Soyate | 21.0 | 0.51 | do | | 0.86 | 5.1 | |
| VIII | Methyl Oleate | 6.0 | 0.72 | 2-ethyl butyl | 89 | 0.0 | 5.16 | |
| IX | do | 10.0 | 0.18 | do | 89 | 0.0 | 5.27 | |

The reaction conditions were the same as outlined in Example I.

EXAMPLES X TO XV

These examples show that repeated usage of the catalyst is possible with substantially equal results.

The methods, conditions, and quantities used for these nitrile preparations were identical with those in Examples I. The nitrile was distilled and the residue considered as catalyst. Fresh soya or stearic acids were added in quantities the same as the first run and reacted with ammonia as indicated, Examples X and XIII respectively, starting with .36% Ti as the tetra isopropoxide.

These results are shown in the following table:

| Example | Fatty Acid | Run No. | Nitrile, Percent Yield | Acid Value | Iodine Value | Percent N |
|---|---|---|---|---|---|---|
| X | Soya | 1 | 85.0 | 0.42 | 109.3 | 5.15 |
| XI | do | 2 | 89.0 | | 116.1 | 5.4 |
| XII | do | 3 | 94.5 | 0.41 | 115 | 5.3 |
| XIII | Stearic | 1 | 95.0 | 0.20 | | 5.0 |
| XIV | do | 2 | 90.5 | 0.02 | 0.73 | 5.25 |
| XV | do | 3 | 98.0 | 0.03 | 0.82 | 5.25 |

The following group of examples, Examples XVI to XVIII inclusive illustrate the use of the polymerized fatty acids and their esters with our preferred catalyst.

EXAMPLE XVI

Dimerized linoleic acid[1] _____ 560 parts.
Catalyst (tetra isopropyl titanate) _____ 12 parts (0.36% Ti).
Ammonia (sufficient for reaction).

[1] Empol 1022 a product of Emery Industries composed of essentially monomeric, dimer and higher polymers.

The conditions for the conversion of those acids to the nitrile were the same as in Example I. The reaction time was 11.5 hours.

For the separation of nitrile and catalyst two alternative methods were used:

(a) *Distillation.*—This method is the same as shown in Example I. The several components in the nitrile were separated by this method. The monomer distilled at 140°–170° C. and the dimer at 260°–270° C. at .5 mm. of Hg pressure respectively. The residue contained catalyst and nitrile, not readily distillable, polymers. The combined distillate was 67% of the total theoretical nitrile.

(b) *Extraction process.*—This is the preferred process for separating the catalyst from polymeric nitriles. The nitriles are dissolved in toluene and then extracted with dilute hydrochloric acid, followed by several hot water washings. The solvents and traces of water are removed by distillation.

The recovered nitriles analyzed as follows:

Percent
Nitrogen _____ 5.07
Acid value _____ 2.45
Iodine value _____ 76.5

EXAMPLE XVII

Methyl ester of polymerized linseed
  oil _____ 574 parts.
Catalyst (tetraisopropyl titanate) ____ 12 parts (0.36 Ti).
Ammonia (sufficient for reaction).

The linseed methyl esters were prepared by methanolysis of a low acid vacuum bodied linseed oil of $Z_2$–$Z_3$ Gardner-Holdt viscosity.

The methyl ester and the catalyst were placed in a reactor as previously described. The ammonia was bubbled through the methyl ester and catalyst mix, as the mixture was heated from 90° C. up to 280° C. for a period of one hour. Thereafter the ammonia flow was continued for an additional 15 hours as the temperature was maintained between 280° C. and 320° C. until evolution of water ceased.

After cooling, the reaction mixture was dissolved in an equal volume of toluene, acidified with 16 parts (by weight) of concentrated hydrochloric acid (HCl) and then washed a number of times with hot water to remove the catalyst. Finally, the toluene and traces of water were distilled off under the reduced pressure at about 0.5 mm. of Hg pressure and up to about 140° C. temperature. The product analyzed 4.85% N and 4.63 acid value.

EXAMPLE XVIII

Polymerized dehydrated castor oil
  acids[1] _____ 560 parts.
Catalyst _____ 12 parts (0.36 Ti).
Ammonia (sufficient for reaction).

[1] Polymerized acids "Century D–75–N" product of Hardesty Chemical Co.

The procedure used was the same as in Example XVI. The temperature was 279° C. to 300° C. for a period of 8.5 hours. Separation of the reaction product was accomplished in the manner indicated under the above example and analyzed 4.87% nitrogen and an acid value of 5.54.

EXAMPLE XIX

Naphthenic acid[1] _____ 560 parts
Catalyst (tetraisopropyl titanate) ____ 12 parts (0.36 Ti).
Ammonia (sufficient for reaction).

[1] Sunaptic Acid "B" a long chain cyclo aliphatic acid of Sun Oil Company (indicated as $C_{21}H_{36}O_2$).

The procedure was the same as in Example I. The reaction temperature was maintained at 267° C. to 300° C. for a period of 12 hours.

The nitrile was obtained from the reaction mixture by distillation at a vapor temperature of 125° to 223° at about 0.9 mm. Hg pressure. The yield was 424 parts, analyzed 4.25% nitrogen and had an acid value of 1.03.

EXAMPLE XX

Tall oil acids[1] _____ 560 parts.
Catalyst (tetraisopropyl titanate) ____ 12 parts (0.36 Ti).
Ammonia (sufficient for reaction).

[1] Acosix—Product of Newport Industries.

The reaction was carried out as indicated in Example I. A temperature of 270° C. to 298° C. for a period of 6 hours reaction was maintained. The resulting nitrile product was distilled from the reaction mixture at a vapor temperature of 140° C. to 225° C. at about 1.0 mm. Hg pressure. The product analyzed 5.05% nitrogen and an acid value of 0.34.

The nitriles prepared in Examples I to XX are readily converted to amines by catalytic hydrogenation. Raney nickel or cobalt, or equivalent forms of these metals in the range of 2% to 10%, based on the nitrile can be used. The reduction can be accomplished in the presence or absence of solvent. To minimize secondary amine formation the reduction is preferably carried out in the presence of ammonia vapor. The total reaction pressure can be up to 2200 p.s.i. of which up to 130 p.s.i. can represent the partial pressure of ammonia. Any suitable pressure vessel equipped with an agitator and the necessary controls can be used.

By way of illustration the following table summarizes the properties of amines prepared from several of the above nitriles:

*Conversion of nitriles to amines*

| Nitrile | | Amine Analysis, Percent Primary Amine |
|---|---|---|
| Base Material | Example No. | |
| "Dimerized" Linoleic Acid | XVI | 4.63 |
| Polymerized Linseed Methyl Esters | XVII | 2.43 |
| Polymerized Dehydrated Castor Acids | XVIII | 3.37 |

In accordance with the patent statutes, we have described and illustrated embodiments of our improvement or discovery in a catalytic method of preparing and obtaining aliphatic nitrile compounds in a liquid phase process. The examples are given by way of exemplification and limited only by the terms of the appended claims.

We claim:

1. A liquid phase process of converting an alcohol ester of a fatty acid compound, having from 8 through 36 carbon atoms in the fatty acid portion and from 1 through 8 carbon atoms in the alcohol portion to a nitrile which consists essentially in the steps of adding to said fatty acid compound from about 0.01% to about 1.5% metal catalyst based on the weight of the compound being converted and in the form of a tetra alcoholate of a metal selected from the group consisting of the tetra-valent metals of group IVB of the periodic table and containing from 1 through 8 carbon atoms in the alcohol groups, mixing and heating said compound and catalyst, adding ammonia and effecting the formation of a nitrile of said compound in the temperature range of about 100° C. to about 315° C.

2. A liquid phase process of converting an aliphatic acid material selected from the group consisting of aliphatic and cycloaliphatic acids and the alcohol ester derivatives thereof, having from 8 to 36 carbon atoms in the acid radical portion and 1 through 8 carbon atoms in the alcohol portion, to a nitrile which consists essentially in adding to said acid material an organic derivative of a metal selected from the group consisting of the tetravalent metals of group IVB of the periodic table and the organic portion being selected from the groups consisting of alcoholates having alkyl groups selected from the group consisting of methyl through octyl and the branched forms thereof, and organic salts having alkyl groups containing 1 to 23 carbon atoms, said metal being present in an amount of from about 0.01% to about 1.5% based on the weight of the material being converted, mixing and heating said acid material and catalyst, adding ammonia and effecting the formation of the nitrile in a temperature range of about 100° C. to about 315° C.

3. The process of claim 2 wherein, the aliphatic acid radical containing material is a saturated straight chain fatty acid containing 12 through 22 carbon atoms in the acid radical.

4. The process of claim 2 wherein, the aliphatic acid material is a monohydric alcohol ester of a saturated straight chain fatty acid containing from 12 to 22 carbon atoms in the acid radical and from 1 to 8 carbon atoms in the alcohol radical.

5. The process of claim 2 wherein, the aliphatic acid material is cycloaliphatic and contains up to 36 carbon atoms.

6. The process of claim 2 wherein, the aliphatic acid material is an unsaturated straight chain fatty acid containing from 12 to 22 carbon atoms.

7. The process of claim 2 wherein, the aliphatic acid material is an ester of a monohydric alcohol and an unsaturated straight chain fatty acid containing from 12 to 22 carbon atoms in the acid radical and from 1 to 8 carbon atoms in the alcohol radical.

8. The process of converting an aliphatic compound selected from the groups consisting of fatty acids and fatty esters with 1 through 8 carbon atoms in the alcohol portion of the ester group and each having a long chain fatty acid group derived from an oil base material selected from the group consisting of animal, vegetable, marine, and mineral oils to a nitrile by the steps consisting essentially of mixing a said aliphatic compound to be converted with a catalytic amount of tetravalent titanium alcoholate, the alcohol portion containing an alkyl group selected from the group consisting of methyl through octyl, agitating and heating the mixture from about 100° C. to about 315° C. adding ammonia to the heated mixture, continuing heating and effecting the addition of nitrogen to said aliphatic compound, and obtaining an aliphatic nitrile.

9. In a liquid phase process of producing a fatty polymeric nitrile having essentially the structure of repeating aliphatic chain units derived from the group consisting of fatty acids and fatty esters having about 12 to about 22 carbon atoms in the acid radicals and 1 through 8 carbon atoms in the alcohol portion before polymerization, the steps consisting essentially of mixing a said polymerized fatty material with an organic derivative of a tetravalent metal selected from the group consisting of group IVB of the periodic table and selected from the group consisting of organic salts and alcoholates of said metal, with the organic radical of said salts having from 1 to 23 carbon atoms and from 1 through 8 carbon atoms in said alcoholates, with the said metal being present in an amount of about 0.01% to about 1.5%, based on the weight of the said material to be converted, agitating and heating the mixture to a temperature of about 100° C. to about 320° C., treating the mixture with ammonia, continuing heating and effecting a reaction between the said material to be converted and the ammonia, and effecting the production of a polymeric nitrile.

10. In a liquid phase process of converting a compound having the empirical formula $$R'-\overset{O}{\underset{\|}{C}}-O-R$$

where R is a substituent selected from the group consisting of hydrogen and alkyls of 1 through 8 carbon atoms and R' represents a member of an aliphatic group consisting of straight, branched and cyclic radicals of 7 through 35 carbon atoms, to a nitrile, the steps comprising mixing said compound with a catalytic amount of an organic derivative of tetravalent metal catalysts wherein the metal is selected from the group IVB of the periodic table and the organic portion is selected from the group consisting of alcoholates having an alkyl group selected from the group consisting of alcoholates of 1 through 8 carbon atoms and branched forms thereof, organic salts containing an initial alkyl group of 1 to 23 carbon atoms and the substituted carbon atoms of R' as above defined, agitating and heating the mixture from about 100° C. to about 315° C., bubbling ammonia through the mixture while continuing heating and effecting the production of a nitrile of said compound.

11. In a liquid phase process of converting a polymeric compound having the empirical formula $$(R^2-\overset{O}{\underset{\|}{C}}-OR)_n$$

where R represents a substituent selected from the group consisting of hydrogen and alkyls of 1 to 8 carbon atoms and $R^2$ is a polymer derived from an aliphatic base unit of 12 through 22 carbon atoms and $n$ represents from about 2 to about 4 said base units, to a nitrile, the steps comprising mixing said polymeric compound with a catalytic amount of an organic derivative of a tetravalent metal catalyst wherein the metal is selected from the group IVB of the periodic table and the organic portion is selected from the group consisting of alcoholates having an alkyl group of 1 through 8 carbon atoms, the branched forms thereof, and organic salts containing an initial alkyl group of 1 to 23 carbon atoms and the substituted carbon atoms of $R^2$ as above defined, agitating and heating the mixture from about 100° C. to about 320° C., adding ammonia to the mixture, continuing heating and effecting the production of a nitrile of said polymeric compound.

References Cited in the file of this patent

UNITED STATES PATENTS

| | | |
|---|---|---|
| 2,234,915 | Jolly | Mar. 11, 1941 |
| 2,493,637 | Niederhauser | Jan. 3, 1950 |
| 2,668,175 | Reppe et al. | Feb. 2, 1954 |
| 2,808,426 | Potts et al. | Oct. 1, 1957 |